US006253878B1

(12) United States Patent
Wells

(10) Patent No.: US 6,253,878 B1

(45) Date of Patent: Jul. 3, 2001

(54) ERGONOMICALLY ADJUSTABLE MACHINE OPERATOR PLATFORM

(76) Inventor: Dale Wells, 1179 Lyons Rd., Dayton, OH (US) 45458

( * ) Notice: Subject to any disclaimer, the term of this patent is extended or adjusted under 35 U.S.C. 154(b) by 0 days.

(21) Appl. No.: 09/376,167

(22) Filed: Aug. 17, 1999

(51) Int. Cl.[7] ................................ B66B 9/02; E04G 1/32; F16M 11/00

(52) U.S. Cl. ......................... 187/268; 187/240; 74/89.15; 182/141; 182/148

(58) Field of Search .................................... 187/214, 268, 187/233, 269, 414, 240; 182/141, 148; 248/188.4; 74/89.15, 424.8 R

(56) References Cited

U.S. PATENT DOCUMENTS

| | | | | |
|---|---|---|---|---|
| 1,905,852 | * | 4/1933 | Greer | 187/268 |
| 2,268,800 | * | 1/1942 | Butzien | 187/268 |
| 4,005,785 | * | 2/1977 | Manaugh | 414/256 |
| 4,459,867 | * | 7/1984 | Jones | 74/89.15 |
| 4,919,236 | * | 4/1990 | Karlsson et al. | 187/268 |
| 5,172,442 | * | 12/1992 | Bartley et al. | 5/611 |
| 5,201,084 | * | 4/1993 | Johnson | 5/81.1 |
| 5,217,090 | * | 6/1993 | Billingtin, III et al. | 187/268 |
| 5,273,132 | * | 12/1993 | Sasaki et al. | 182/148 |
| 5,282,593 | * | 2/1994 | Fast | 248/188.4 |
| 5,404,968 | * | 4/1995 | Fletcher | 187/205 |
| 5,461,935 | * | 10/1995 | Hill | 74/424.8 R |
| 5,501,296 | * | 3/1996 | Fletcher | 187/210 |
| 5,573,083 | * | 11/1996 | Fletcher et al. | 187/205 |
| 5,617,622 | * | 4/1997 | Anderson | 29/281.3 |
| 5,626,208 | * | 5/1997 | Sprague et al. | 187/268 |
| 5,704,249 | * | 1/1998 | Krauska | 74/89.15 |
| 5,755,310 | * | 5/1998 | Wourms | 187/267 |
| 5,951,776 | * | 9/1999 | Selyutin et al. | 187/268 |
| 6,009,791 | * | 1/2000 | Medlin | 89/38 |

* cited by examiner

*Primary Examiner*—Dean J. Kramer
*Assistant Examiner*—Paul T. Chin
(74) *Attorney, Agent, or Firm*—R. William Graham

(57) ABSTRACT

An ergonomically adjustable machine operator platform includes a worker support surface which includes a top surface and a bottom, a plurality of support legs disposed on a floor, wherein each support leg includes an external threaded surface portion, a drive member operably connected to each support leg and having an inner threaded bored surface therethrough which is configured to be complimentary threaded to the external threaded surface portion in a manner to permit axial movement along the support leg and wherein the drive member includes a bearing support surface disposed adjacent the bottom. The drive member further includes an exterior sprocket surface extending generally radially from the drive member, and a rotating device connected to the external sprocket surface for rotating the drive member to cause axial movement along the support leg to vertically move the worker support surface.

10 Claims, 6 Drawing Sheets

ERGONOMICALLY ADJUSTABLE MACHINE OPERATOR PLATFORM

BACKGROUND OF THE INVENTION

1. Field of the Invention

The invention relates to platforms used to elevate a machine operator. More particularly, the invention is directed to improvements in adjustable machine operator platforms.

2. Related Art

Assembly line work typically requires a worker to standing at a station for an extended period of time to perform a manual task. The machinery is typically fixed at a predetermined height. If the operator is taller or smaller than average, the operator cannot comfortably work at the station. The operator must bend, extend or reach to do the work which causes the operator to prematurely fatigue. Therefore, the operator's height must be taken into consideration in achieving maximum work productivity. Accordingly, there is a need to accommodate the height of the machine operator. Platforms have been made to accommodate the machine operator's height.

For example, there exist platforms which are height adjustable to aid the machine operator in comfortably performing the job. Height adjustable work platforms maximize the operator's effectiveness by positioning the operator at a height which permits easier access to work areas. These platforms have aided by preventing muscle strain and fatigue.

While the advent of adjustable platforms have been an improvement over traditional fixed work platforms, they have had problems in their implementation into the work environment. For example, present height adjustable platforms frequently fail due to the environment in which they are used. Debris, such as metal shavings have a tendency to become caught in the moving parts and cause seizure. Hydraulic systems employed are relatively expensive and also are less reliable than desired.

Thus, a more suitable height adjustable platform is desired which is readily movable to a desired location and able to withstand rigorous environments while maintaining user friendly characteristics. Also, a platform structure which is relatively low cost, easy to manufacture and use is desirable. The present invention aims at meeting these desires.

BRIEF SUMMARY OF THE INVENTION

It is an object to improve work conditions in an assembly or work line environment.

It is another object to improve height adjustable platforms.

It is another object to improve the lifting mechanisms in height adjustable platforms.

Another object is to provide a platform which is electromechanically height adjustable to a desired height.

Still another object of the present invention is to provide a platform which is relatively low cost, user friendly, mobile and rugged.

Accordingly, the present invention is directed to an ergonomically adjustable machine operator platform, which includes:

- a worker support surface which includes a top surface and a bottom;
- a plurality of support legs disposed on a floor, wherein each said support leg includes an external threaded surface portion;
- a drive member operably connected to each support leg and having an inner threaded bored surface therethrough which is configured to be complimentary threaded to the external threaded surface portion in a manner to permit axial movement along the support leg and wherein the drive member includes a bearing support surface disposed adjacent the bottom, the drive member further includes an exterior sprocket surface extending generally radially from said drive member; and
- means connected to the external sprocket surface for rotating the drive member to cause axial movement along the support leg to vertically move the worker support surface.

Other objects and features of the invention advantage which will become apparent from reading the following and are set forth in more detail in the description and accompanying drawings.

DETAILED DESCRIPTION OF THE INVENTION

Figure 1:
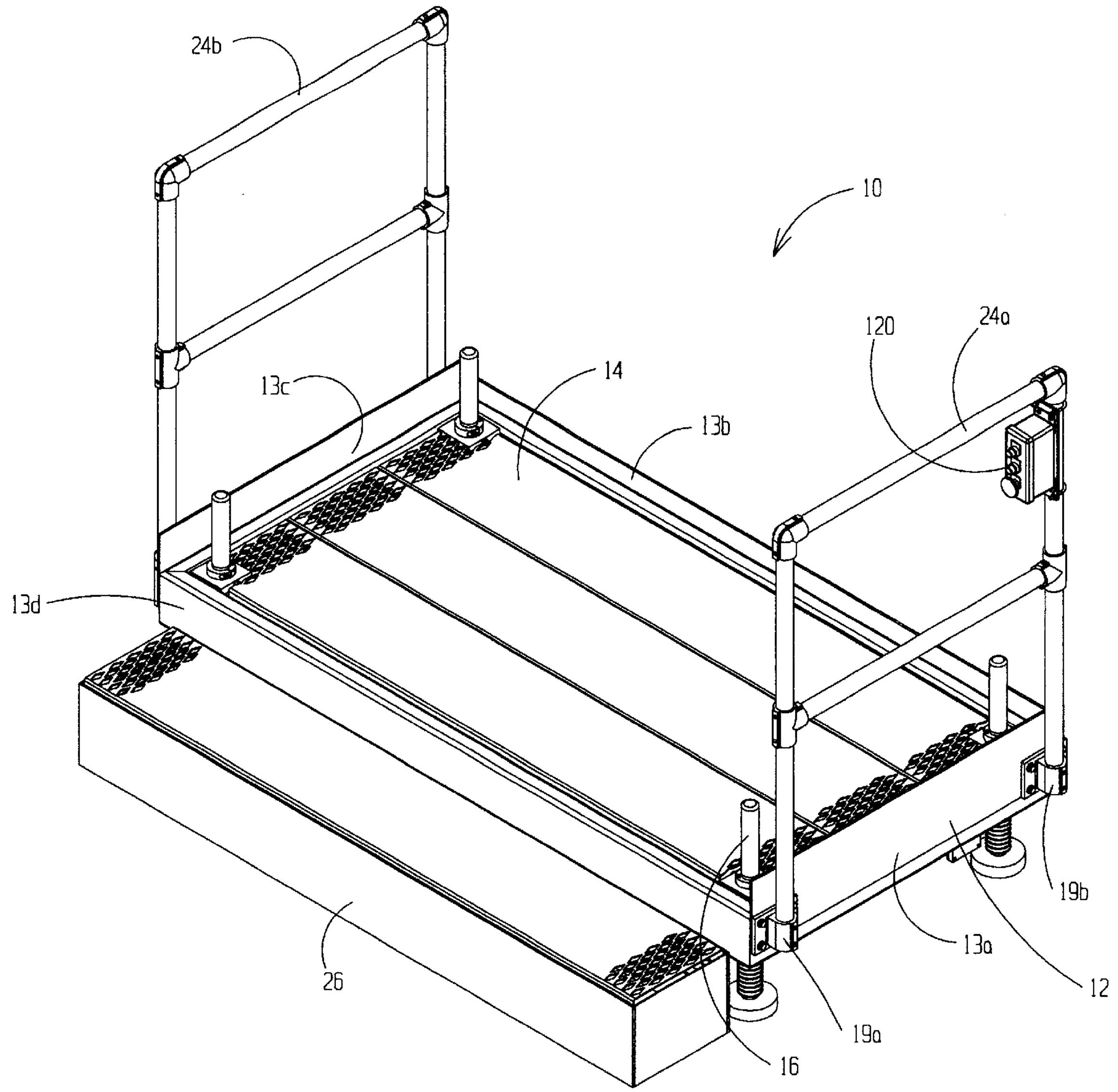
FIG. 1 is a perspective view of an ergonomically adjustable machine operator platform in accordance with the present invention.

Referring now to the drawings which are illustrated in the accompanying Figures, an ergonomically adjustable machine operator platform of the present invention is generally identified by the numeral 10. The platform 10 is commonly used with a machine (not shown) wherein the machine operator is required to be disposed at a certain height in order to operate the machine. The platform 10 is preferably portable and moved a desired site.

The platform 10 includes a support frame 12, a worker support surface 14 connected to the support frame 12, a plurality of support legs 16, and drive chain assembly 18, drive motor/shaft member 20, power source housing 22 operably interconnecting to each support leg 16 and railing 24*a* and 24*b* connected to the support frame 12. A portable step 26 is also provided which is disposed adjacent the platform 10 such that when the platform 10 is in the low position, the machine operator can easily step up on the worker support surface 14.

Figure 2:
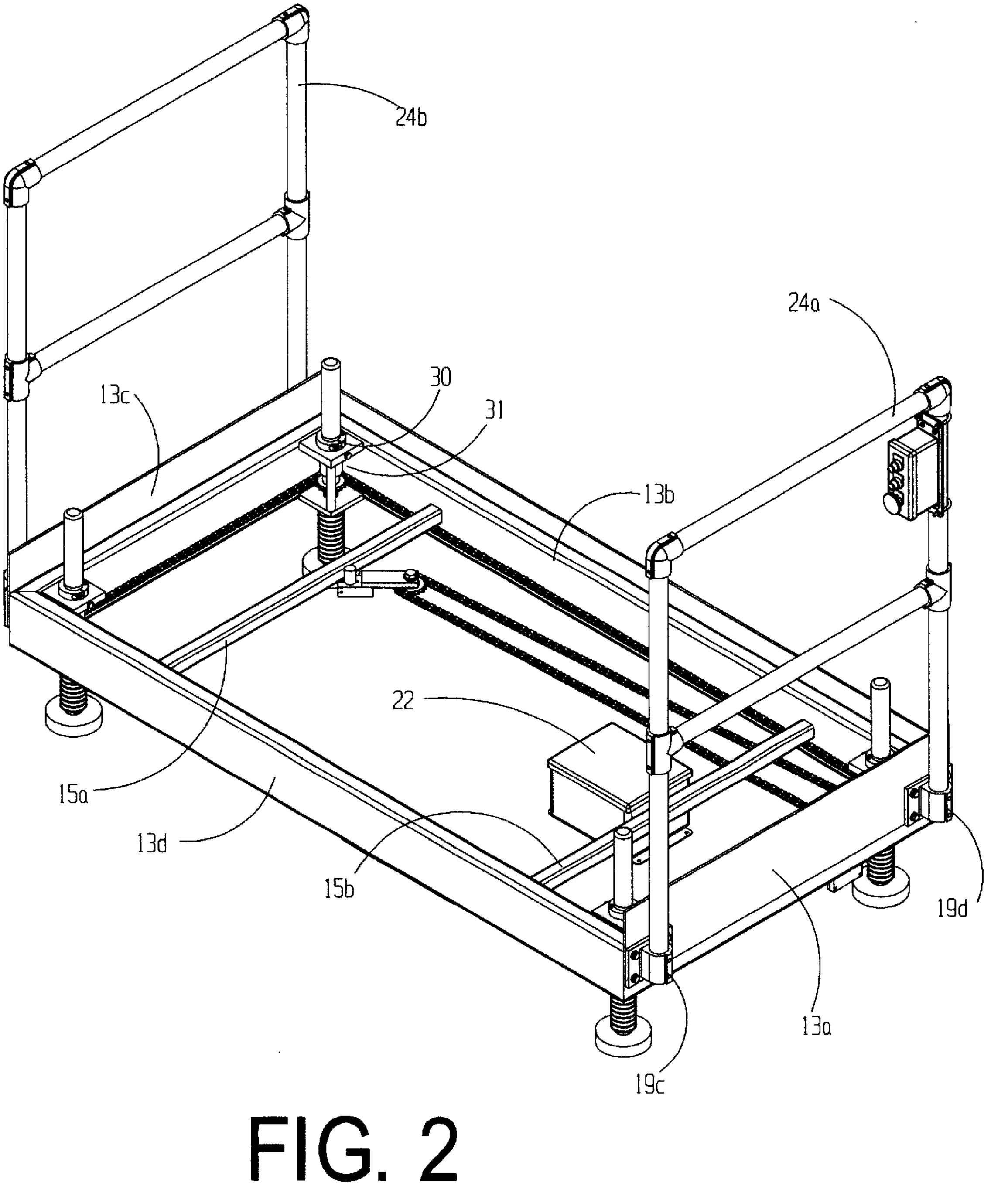
FIG. 2 is another perspective view of an ergonomically adjustable machine operator platform in FIG. 1, shown with the worker support surface removed.
Figure 3:
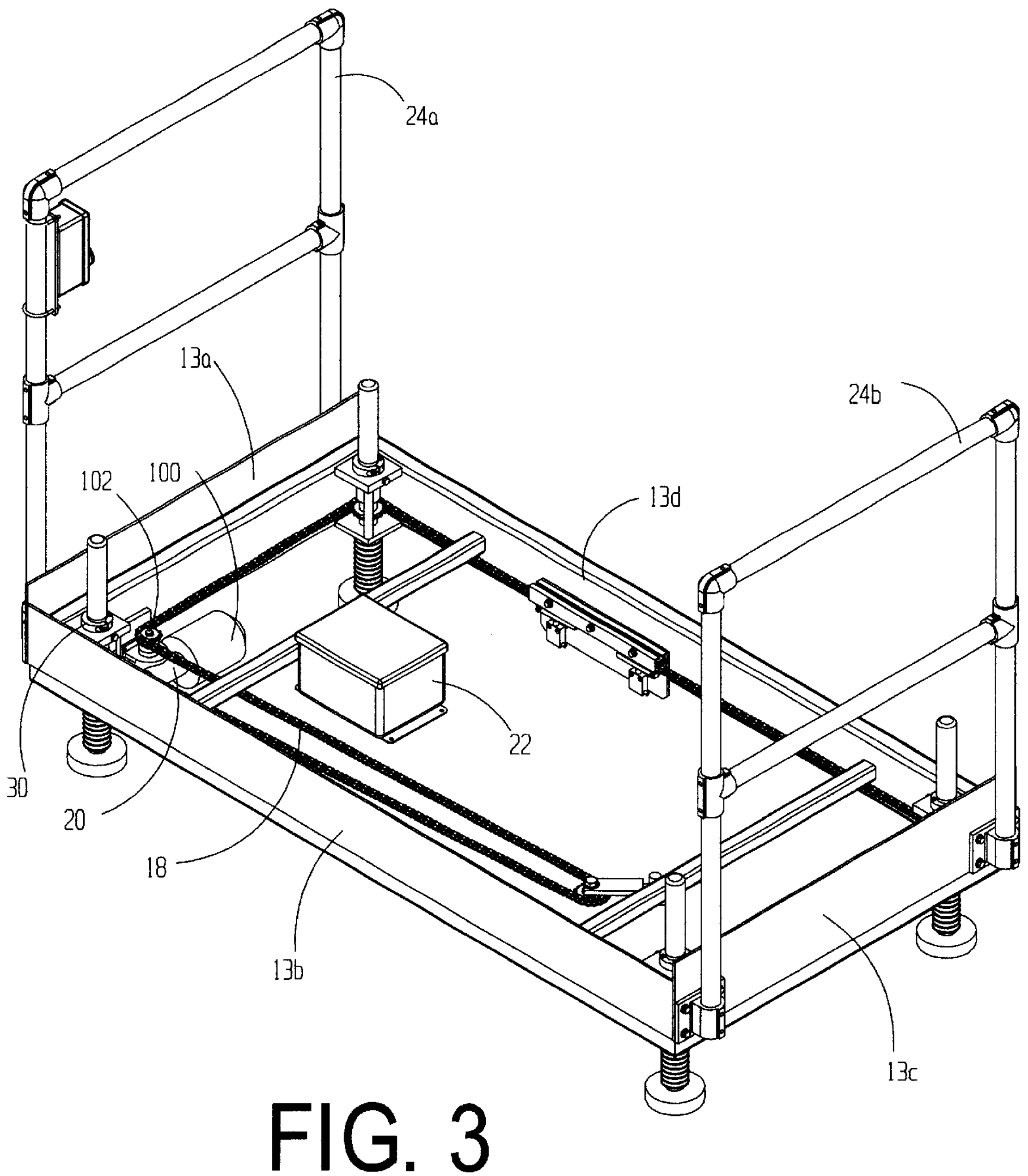
FIG. 3 is another perspective view of an ergonomically adjustable machine operator platform in FIG. 1, shown with the worker support surface removed.
Figure 4:
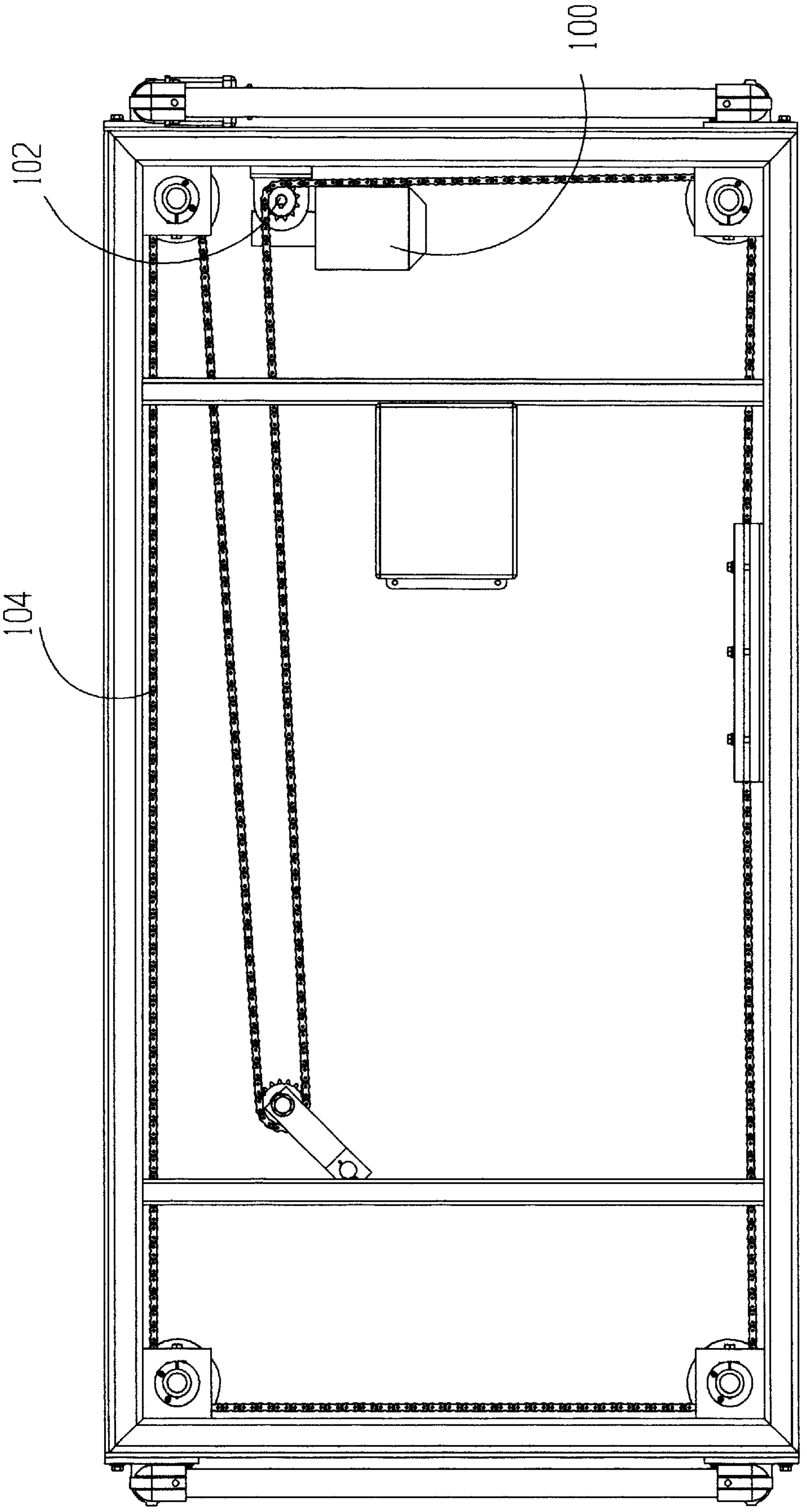
FIG. 4 is a bottom view of the ergonomically adjustable machine operator platform of FIG. 1.

More specifically in FIGS. 2 and 3, the support frame 12 includes four side beams 13*a*, 13*b*, 13*c* and 13*d* which are fixably interconnected to one another at their ends. Cross beams 15*a* and 15*b* fixably interconnect side beams 13*b* and 13*d* and aid in supporting the worker support surface 14. The support frame 12 is of a rigid construction material, such as steel, as is the worker support surface 14.

The railing 24*a* and 24*b* are of a type known in the art, such as tubular steel, and removably connect to the side beams 13*a* and 13*c*, respectively. Removable mounts 19*a* and 19*b*, and 19*c* and 19*d* connect to side beams 13*a* and 13*c*, respectively, to the railings 24*a* and24*b*, respectively.

Figure 5:
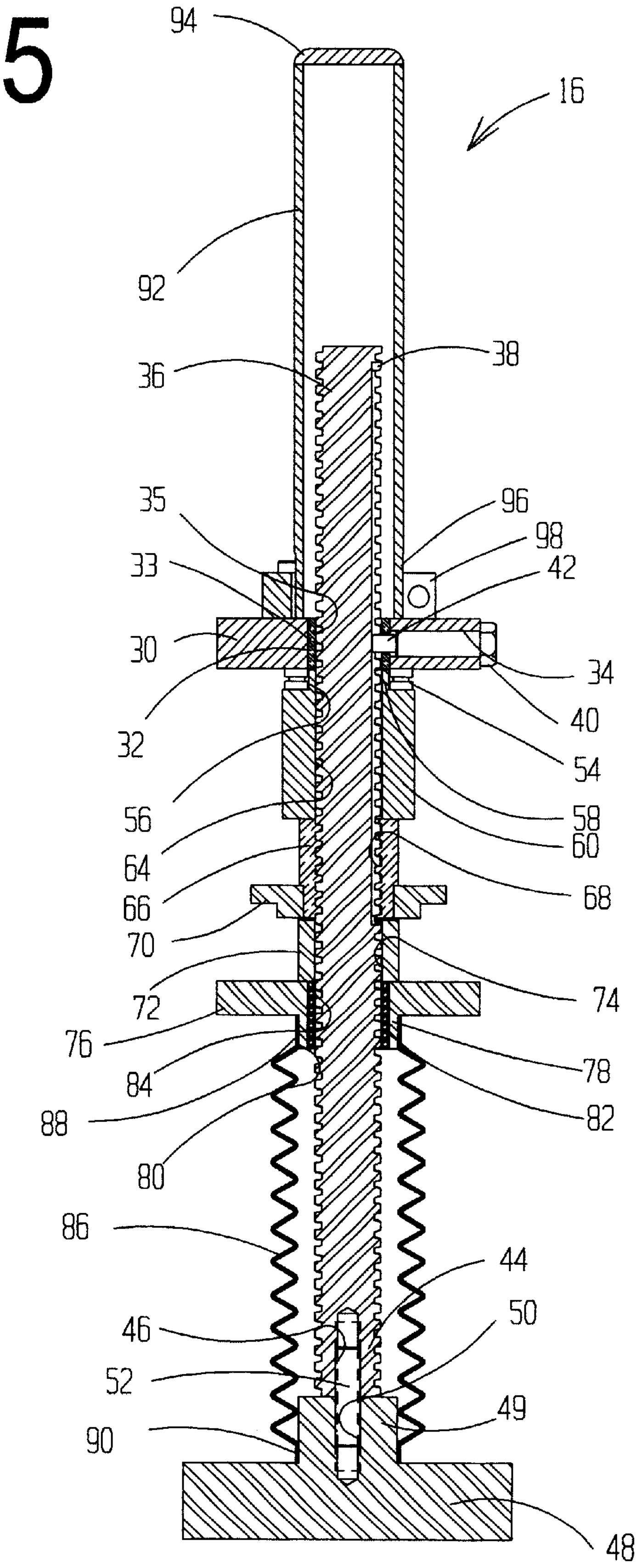
FIG. 5 is a cross-sectional view of a support leg used in the present invention.

Turning to FIGS. 5 and 2, the support legs 16 and their connection and operation with the support frame 12 are as follows. For brevity, one support leg 16 connection will be discussed as the support legs 16 are identical and interconnections similar for all side beams 13*a*, 13*b* 13*c* and 13*d*.

Accordingly, a generally rectangular top plate 30 is fixably connected to an inside corner surface 31 formed by the connection of the ends of side beams 13*b* and 13*c*. The top plate 30 includes a generally cylindrical central inner open surface 32 extending axially therethrough. A generally cylindrical bushing 33 has an outer diameter to fit within the open surface 32 and inner open surface 35 therethrough. Another inner open threaded surface 34 extends from an outer surface of the top plate 30 radially inward through the top plate 30 and the bushing 33 to the open surface 35 formed within the bushing 33.

The support leg 16 includes a rigid generally cylindrical threaded screw 36 having an outer diameter slightly less than an inner diameter of open surface 35 to permit relatively unrestricted movement therebetween. The threaded screw 36 includes a keyway 38 which longitudinally extends a predetermined length along the threaded screw 36. A threaded anti-rotation screw 40 is threaded to the threaded inner open surface 34 and has an end stop 42 of a size and configuration to be slidably received within the keyway 38. When the screw 40 is threaded to the top plate 30, the end stop 42 limits the travel of the top plate 30 to the approximate length of the keyway 38. Also, a bottom end 44 of the threaded screw 36 includes a generally axially inwardly extending threaded open surface 46 which is generally centrally positioned.

A foot 48 having an upwardly extending collar 49 is disposed on a floor. The foot 48 includes a threaded open surface 50 which extends generally axially inwardly through the collar 49 and is generally centrally positioned having a diameter substantially that of open surface 46. A threaded connecting screw 52 threadably interconnects the screw 36 and foot 48 via threaded open surfaces 46 and 50, respectively, such that the end 44 sits on the foot 48.

Below the top plate 30 is a thrust bearing assembly 54 having a central open surface 56 of a diameter larger than the diameter of a collar 58 of a combination spacer and thrust bearing locator 60. The locator 60 includes a generally centrally located open surface 64 which axially extends therethrough and has a diameter slightly larger then the screw 36 to permit relatively unrestricted movement along the screw 36.

A nut 66 includes a threaded inner surface 68 which is of a diameter and complimentary configuration to threadably receive the threaded screw 36. A sprocket 70 radially extends from the nut 66. The sprocket 70 is fixed to the nut 66 such that as the sprocket 70 is turned so turns the nut 66 causing the nut 66 to move axially up or down along the screw 36 depending upon the direction the sprocket 70 is turned.

A generally cylindrical spacer bearing 72 is provided about the screw 36 and has an open surface 74 generally centrally extending therethrough. The spacer bearing 72 is disposed below the nut 66 and sprocket 70 in a manner to permit relatively unrestricted movement along the screw 36.

A bottom plate 76 having a collar 78 includes a generally centrally located open surface 80 which axially extends therethrough larger than the diameter of the screw 36. A generally cylindrical bushing 82 is disposed between the threaded screw 36 and the open surface 80 and similarly has an inner open surface 84 of a diameter slightly larger then the screw 36 to permit relatively unrestricted movement along the screw 36. The collar 78 is disposed downward towards the foot 48.

A protective expandable bellows 86 is disposed about the threaded screw 36 in a spaced relation thereto. The ends 88 and 90 of the bellows 86 connect to collars 78 and 49, respectively. The bellows 86 protects the screw 36 from debris, such as metal shavings or the like, which can cause the nut 66 to bind with the screw 36. The bellows 86 is accordion like and can expand and contract with the aforesaid parts as they move axially up and down the screw 36. The bellows 86 is thus preferably of an elastic nature, such as neoprene rubber.

Similarly, a top cover 92 is disposed about the threaded screw 36 in a spaced relation thereto above the top plate 30. A top end 94 is closed and bottom end 96 is open and interconnects to the top plate 30 via a collar clamp 98 which mounts to the top plate 30.

Power source housing 22 includes power source connections and is operably connected in a suspended manner from the cross beam 15*b*. The drive member 22 operably connects to drive motor/shaft member 20 which includes a drive motor 100 and drive motor speed reducer and drive shaft 102.

Figure 6:
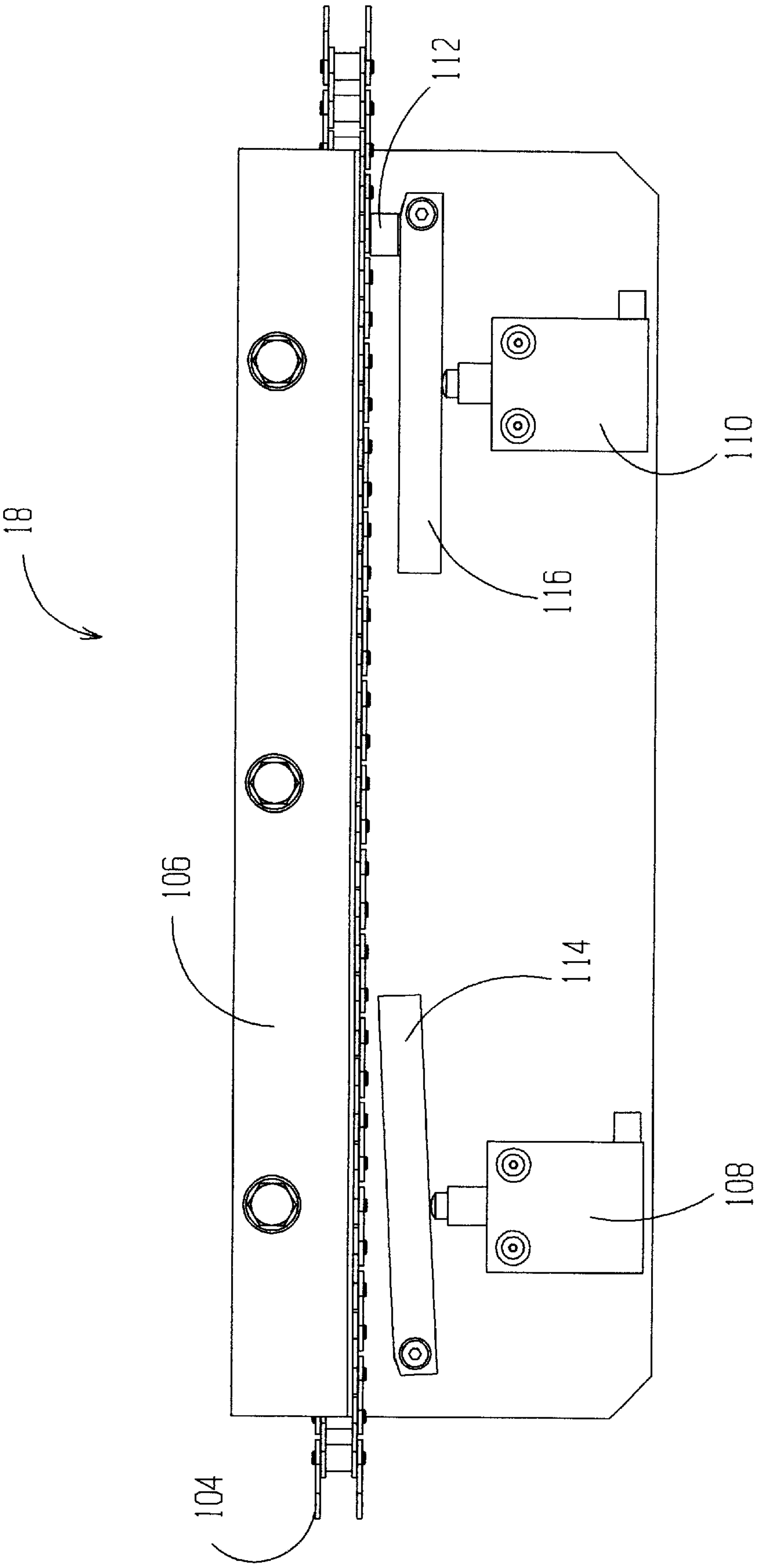
FIG. 6 depicts a travel switch assembly used in the present invention.

The drive shaft 102 is operably connected to drive member 18 via a roller drive chain 104. As seen in FIG. 6, the drive chain assembly 18 further includes a travel switch assembly 106 having an up end travel switch 108 and a down end travel switch 110, both of which are operatively connected to the drive member 22 to cause power to cease to drive member 20 when switch contact 112 contacts either switch contact arm 114 or 116 and limit directional travel of said roller drive chain 104. This prevents run-out of the anti-rotation screw 40 through the keyway 38 as seen in FIG. 5. This, together with the end stop 42 limits, the vertical movement of the worker support surface 14 (FIG. 1) is limited and provides a safety stop mechanism.

The roller drive chain 104 is operatively connected to each of the sprockets 70. As the sprockets 70 turn, the nut 66 is controllably driven axially along the length of the screw 36. This in turn indirectly causes the platform to go up and down. An operator controller 120 is connected to the support railing 24*a* and operatively connected to the drive member 22.

The platform 10 may be readily used by workers of different heights to enhance the work environment and productivity of the workers without having to change the machinery set up. The present invention further provides a platform which is more reliable and relatively inexpensive. The platform 10 is also provided to endure rigorous machine operating environments.

The above described embodiments is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. An ergonomically adjustable machine operator platform, which includes:

a worker support surface which includes a top surface and a bottom;

a plurality of support legs on a floor, wherein each of said support legs includes an external threaded surface portion and wherein at least one of said support legs includes a longitudinally axially extending keyway in said external threaded surface portion, and further includes a stop operably associated with said worker support surface which permits longitudinal axial travel within said keyway between a first and second position to limit vertical movement of said worker support surface and wherein said stop prevents rotational movement of said support leg;

a drive member operably connected to each support leg and having an inner threaded bored surface therethrough which is configured to be complimentary threaded to said external threaded surface portion in a manner to permit axial movement along said support leg, and wherein said drive member is disposed in a bearing manner adjacent to said bottom of said worker support surface and wherein said drive member further includes a threaded nut having an exterior sprocket surface attached thereto, said sprocket surface extending generally radially from said drive member;

means connected to said external sprocket surface said means including a roller drive chain operably connected to said sprocket surface and a rotatable drive shaft connected to said roller drive chain and a drive motor for rotating said drive member to cause axial movement along said support leg to vertically move said worker support surface; and a travel switch connected to said roller chain drive to limit vertical travel of said worker support surface.

2. The platform of claim 1, which includes means for stopping said rotating means such that said worker support surface can be disposed at predetermined axial positions along said support leg.

3. The platform of claim 1, which includes means connected to said support leg for covering said external threaded surface portion as said drive member threadably moves along axially along said support leg.

4. The platform of claim 3, wherein said covering means includes a top cover extending over said support leg in a spaced relation thereto above said drive member and operably connected to the top surface of said worker support surface and an expandable bellows cover which axially extends about said support leg below said drive member in a spaced relation thereto, wherein said top cover and said bellows cover cooperate in a manner to substantially cover said support leg as said drive member moves axially along said support leg.

5. The platform of claim 1, which further includes a controller connected to said rotating means for controlling the amount of rotation of said drive member and axial position of said worker support surface and height thereof.

6. The platform of claim 1, which further includes controller means for controlling the travel of said roller drive chain.

7. The platform of claim 1, which further includes a roller thrust bearing disposed between said drive member and said bottom of said worker support surface.

8. The platform of claim 7, which further includes a spacer disposed between said roller thrust bearing and said drive member.

9. An ergonomically adjustable machine operator platform, which includes:

a worker support surface which includes a top surface and a bottom;

a plurality of support legs on a floor, wherein each of said support legs includes an external threaded surface portion wherein at least one support leg includes a longitudinal axially extending keyway therein, and further includes a stop operably associated with said worker support surface which permits longitudinal axial travel within said keyway between a first and second position to limit vertical longitudinal axial travel within said keyway between a first and second position to limit vertical movement of said worker support surface and wherein said stop prevents rotational movement of said support leg, a drive member operably connected to each support leg and having an inner threaded bored surface therethrough which is configured to be complementary threaded to said external threaded surface portion in a manner to permit axial movement along said support leg, and wherein said drive member includes a threaded nut having an exterior sprocket surface attached thereto and extending generally radially from said drive member;

means operably connected to said external sprocket surface said means including a roller drive chain operably connected to said sprocket surface and a rotational drive shaft connected to said roller drive chain and a drive motor for rotating said drive member to cause axial movement along said support leg to vertically move said worker support surface;

a roller thrust bearing disposed between said drive member and said bottom of said worker support surface, which further includes a spacer disposed between said roller thrust bearing and said drive member; and a travel switch connected to said roller drive chain to limit vertical travel of said worker support surface.

10. The platform of claim 9, which further includes a controller connected to said rotating means for controlling the amount of rotation of said drive member and axial position of said worker support surface and height thereof.

* * * * *